(12) United States Patent
Longsdorf et al.

(10) Patent No.: US 8,180,466 B2
(45) Date of Patent: May 15, 2012

(54) PROCESS DEVICE WITH SUPERVISORY OVERLAYER

(75) Inventors: Randy Longsdorf, Chaska, MN (US); Dale Davis, Prior Lake, MN (US); Robert Hedtke, Young America, MN (US); Scott Nelson, Plymouth, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/719,163

(22) Filed: Nov. 21, 2003

(65) Prior Publication Data
US 2005/0113942 A1 May 26, 2005

(51) Int. Cl.
| G01B 3/00 | (2006.01) |
| G01R 27/08 | (2006.01) |
| G01R 31/26 | (2006.01) |
| G05B 9/02 | (2006.01) |
| G06F 11/00 | (2006.01) |
| G06F 15/16 | (2006.01) |
| G06F 19/00 | (2011.01) |
| G21C 17/00 | (2006.01) |

(52) U.S. Cl. ............ 700/79; 700/80; 324/713; 324/719; 702/33; 702/104; 702/122; 702/182; 702/183; 702/188; 709/250

(58) Field of Classification Search .................... 700/79, 700/51, 140, 80; 477/5; 324/718, 713; 702/33, 702/104, 122, 182, 183, 188; 709/250
See application file for complete search history.

(56) References Cited

U.S. PATENT DOCUMENTS

| 4,356,900 | A | * | 11/1982 | Sommer .......................... 477/5 |
| 4,804,958 | A | | 2/1989 | Longsdorf ............... 340/870.07 |
| 5,036,886 | A | | 8/1991 | Olsen et al. .............. 137/625.65 |
| 5,058,043 | A | * | 10/1991 | Skeirik .......................... 700/167 |
| 5,416,409 | A | | 5/1995 | Hunter ....................... 324/158.1 |
| 5,481,200 | A | | 1/1996 | Voegele et al. |
| 5,573,032 | A | | 11/1996 | Lenz et al. |
| 5,764,891 | A | * | 6/1998 | Warrior .......................... 710/72 |
| 5,828,567 | A | * | 10/1998 | Eryurek et al. ................. 700/79 |
| 5,874,895 | A | * | 2/1999 | Devarney ...................... 340/514 |
| 5,956,663 | A | | 9/1999 | Eryurek et al. ............... 702/183 |
| 5,970,430 | A | | 10/1999 | Burns et al. |
| 6,017,143 | A | * | 1/2000 | Eryurek et al. ................. 700/51 |
| 6,026,352 | A | | 2/2000 | Burns et al. |

(Continued)

FOREIGN PATENT DOCUMENTS
DE 42 09 785 A1 9/1993
(Continued)

OTHER PUBLICATIONS
Computer—Wikipedia, the free endocyclopedia.*
(Continued)

*Primary Examiner* — Albert Decady
*Assistant Examiner* — Jennifer L Norton
(74) *Attorney, Agent, or Firm* — Westman, Champlin & Kelly, P.A.

(57) ABSTRACT

A process device is configured to meet a desired Safety Integrity Level (SIL). A device interface is configured to couple to the process device and provide an output related to operation of a component of the process device. A component monitor monitors operation of the component and identifies a safety event of the component. A safety response module responds to a safety event of the component in accordance with a safety response.

29 Claims, 5 Drawing Sheets

U.S. PATENT DOCUMENTS

| | | | |
|---|---|---|---|
| 6,047,220 A * | 4/2000 | Eryurek | 700/28 |
| 6,176,247 B1 | 1/2001 | Winchcomb et al. | 137/14 |
| 6,186,167 B1 | 2/2001 | Grumstrup et al. | |
| 6,389,568 B1 | 5/2002 | Leshay et al. | 714/749 |
| 6,476,522 B1 * | 11/2002 | Hays et al. | 307/140 |
| 6,631,882 B2 | 10/2003 | Mack | |
| 6,647,301 B1 * | 11/2003 | Sederlund et al. | 700/79 |
| 6,654,697 B1 | 11/2003 | Eryurek et al. | 702/47 |
| 6,957,115 B1 | 10/2005 | Meyer-Grafe et al. | 700/108 |
| 6,970,003 B2 * | 11/2005 | Rome et al. | 324/718 |
| 7,018,800 B2 | 3/2006 | Huisenga et al. | |
| 7,046,180 B2 | 5/2006 | Jongsma et al. | |
| 7,054,765 B2 * | 5/2006 | Flaemig et al. | 702/47 |
| 7,089,086 B2 | 8/2006 | Schoonover | 700/275 |
| 7,098,798 B2 | 8/2006 | Huisenga et al. | |
| 7,464,721 B2 * | 12/2008 | Perry et al. | 137/14 |
| 7,486,997 B2 * | 2/2009 | Muneta | 700/21 |
| 7,667,354 B2 * | 2/2010 | Graupner et al. | 307/326 |
| 7,809,449 B2 * | 10/2010 | Esch et al. | 700/21 |
| 7,813,820 B2 * | 10/2010 | Opem et al. | 700/79 |
| 7,853,339 B2 * | 12/2010 | Miller et al. | 700/51 |
| 7,865,251 B2 * | 1/2011 | Law et al. | 700/19 |
| 7,918,134 B2 * | 4/2011 | Hedtke et al. | 73/718 |
| 2002/0121910 A1 | 9/2002 | Rome et al. | 324/718 |
| 2003/0062494 A1 | 4/2003 | Snowbarger et al. | |
| 2003/0236579 A1 * | 12/2003 | Hauhia et al. | 700/79 |
| 2005/0113942 A1 | 5/2005 | Longsdorf et al. | |
| 2005/0149295 A1 | 7/2005 | Pfundlin et al. | |
| 2005/0168343 A1 | 8/2005 | Longsdorf et al. | |
| 2005/0274417 A1 | 12/2005 | Perry et al. | |
| 2006/0069455 A1 | 3/2006 | Longsdorf et al. | |
| 2007/0270982 A1 * | 11/2007 | Foss et al. | 700/26 |
| 2011/0057811 A1 * | 3/2011 | Hedtke | 340/870.02 |

FOREIGN PATENT DOCUMENTS

| | | |
|---|---|---|
| DE | 298 24 256 U1 | 7/2001 |
| EP | 1 396 771 A1 | 3/2004 |
| JP | 1274260 | 11/1989 |
| JP | 4116473 | 4/1991 |
| JP | 5134712 | 6/1993 |
| JP | 8035653 | 2/1996 |
| JP | 8087317 | 4/1996 |
| JP | 9130446 | 5/1997 |
| JP | 10229588 | 8/1998 |
| JP | 11341003 | 8/1999 |
| JP | 2000076571 | 3/2000 |
| JP | 2000215113 | 8/2000 |
| JP | 2000308277 | 11/2000 |
| JP | 2002111705 | 4/2002 |
| JP | 2002229867 | 8/2002 |
| JP | 2003050677 | 2/2003 |
| JP | 2003233416 | 8/2003 |
| WO | WO 98/29785 | 7/1998 |
| WO | WO 00/79352 | 12/2000 |
| WO | WO 00/79352 A2 | 12/2000 |
| WO | WO 00/79359 | 12/2000 |
| WO | WO0079352 | 12/2000 |
| WO | WO 03/019310 | 3/2003 |
| WO | WO 03/040657 A2 | 5/2003 |
| WO | WO 03/040851 A2 | 5/2003 |
| WO | WO 03/060851 A1 | 7/2003 |

OTHER PUBLICATIONS

Wikipedia definition for "Retrofit", http://en.wikipedia.org/wiki/Retrofit.*
U.S. Appl. No. 10/733,558, filed Dec. 11, 2003.
U.S. Appl. No. 10/635,944, filed Aug. 7, 2003.
"Functional Safety and Safety Integrity Levels", *Applications Note*, Apr. 2002, pp. 1-6.
Article entitled "Safety Field$^{TT}$2600T Pressure Transmitter Family", *ABB Instrumentation Spa*, 29 pages.
U.S. Appl. No. 10/829,124, filed Apr. 21, 2004.
Technology and Innovation in Process Control, FIELDVUE Instruments, 2002.
"Safety Networks—Increase Productivity, Reduce Work-Related Accidents and Save Money" Online 2003, XP002353502, http://www.can-cia.org/devicenet/CIPWh.
"Notification of Transmittal of International Search Report and Written Opinion" for PCT/US2004/037289.
"Notification Concerning Transmittal of International Preliminary Report on Patentability" for PCT/US2004/037289.
U.S. Appl. No. 10/866,930, filed Jun. 14, 2004.
U.S. Appl. No. 10/955,790, filed Sep. 30, 2004.
Search Report "Notification of Transmittal of the International Search Report or the Declaration", PCT/US2004/025289.
U.S. Appl. No. 11/095,386, filed Mar. 31, 2005.
"Computer", Wikipedia, the free encyclopedia, pp. 1-12, as of Sep. 29, 2006.
International Search Report dated Nov. 5, 2004 for International application No. PCT/US2004/025289.
Fieldvue Instruments, "Improving Safety Instrumented System Reliability", Emerson Process Management, pp. 1-8, Feb. 2002.
Examination Report from European Patent Office in connection with corresponding European Patent Application No. 04819520.0-1239.
Official Action Translation for Application No. 2006121993/09(023889), filed Jun. 20, 2006 for PCT Application No. U52004/037289 of Nov. 8, 2004; 3 pages.
Second Office Action for related Chinese Application No. 20048003438.4, dated Sep. 5, 2008.
Official Action from corresponding Chinese Application Serial No. 200480034382.4, dated Jun. 26, 2009.
Rejection Notice from related Japanese Patent Application No. 2006-541242 dated Dec. 21, 2009; 6 pages.
Rejection Notice from related Japanese Patent Application No. 2006-541242 dated May 28, 2010; 8 pages.
Notification of Reexamination, Part 1 from related Chinese Patent Application No. 200480034382.4 dated Jul. 13, 2010; 8 pages.
Second Notification of Reexamination, Part 1 from related Chinese Patent Application No. 200480034382.4 dated Oct. 20, 2010; 4 pages.
Office Action from corresponding Indian Application No. 2236/CHENP/2006, dated Jul. 26, 2010.
Rejection Notice from related Japanese Application No. 2006-541242 dated of Drafting Dec. 20, 2010 and Dispatch date Dec. 22, 2010, 2 pages.
Translation of the Re-Examination Determination from Chinese Application No. 200480034382.4, dated Apr. 28, 2011, 4 pages.

* cited by examiner

PROCESS DEVICE WITH SUPERVISORY OVERLAYER

BACKGROUND OF THE INVENTION

The present invention relates to process devices of the type used to monitor or control operation of an industrial process. More specifically, the present invention relates to safety certification of such process devices.

Process devices are used in industrial process control systems to monitor and/or control industrial processes. A control device is a process device which is used to control the process. Example control devices include pumps, valves, actuators, solenoids, motors, mixers, agitators, breakers, crushers, rollers, mills, ball millers, kneaders, filters, blenders, cyclones, centrifuges, towers, dryers, conveyors, separators, elevators, hoists, heaters, coolers, and other such equipment. A transmitter is a process device which is used to sense (or monitor) operation of the process, for example by monitoring a process variable such as temperature, pressure, flow, etc. The monitored process variable is transmitted so that it can be used by other equipment in the process, for example by a central control room. Another example process device is a process monitor or communicator which is used to monitor operation of the process, equipment used in the process such as process transmitters or process controllers, and control process devices, for example by programming or sending instructions to the device.

Typically, process devices have a fairly robust design and are manufactured for long life with a low failure rate. The failure of a process device can have significant impact on the process and may require the process to be temporarily shut down while the device is repaired or replaced. However, there are some applications for process devices which require a level of performance which significantly surpasses the level provided by typical process devices. Such devices must meet a "safety certification process" or a "Safety Integrity Level" (SIL) certification. This certification provides a metric for configuring a process to meet a desired safety requirement.

Safety integrity levels are a set of standards which provide metrics which can be used to measure the safety of a process. Safety integrity levels can provide information and provide a way of measuring expectations regarding whether a process can perform safely, and, in case of a failure, will the process fail in a safe manner. SIL ratings are related to a products reliability. For example, a product must be shown to "be available" to perform its designated task at some predetermined rate. This availability is related to the mean time between failures (MTBF) for the product as well as the mean time to repair (MTTR), and the probability to fail on demand (PFD). In general, the use of safety integrity levels is described in "Functional Safety and Safety Integrity Levels" Applications Note Bently Nevada BN Part Number 149409-01 Revision A, April 2002. One technique which can be used to increase the safety integrity level certification for a device is to use components such as electrical or mechanical parts which are less likely to fail. Design procedures can also be used for example providing redundant systems to reduce failures. In addition to reducing failures, process devices can be used to detect a particular failure event and provide a desired response, such as a controlled shut down of the process. In general, designing a process device in order to meet such certification requirements is a difficult and time consuming process.

SUMMARY

An apparatus for use in a process device provides a desired Safety Integrity Level (SIL) for the process device. A device interface couples to the process device and provides an output related to operation of a component of the process device. A component monitor monitors operation of the component with the output from the device interface and identifies a safety event of the component. A safety response module responds to the safety event of the component in accordance with a desired response.

DETAILED DESCRIPTION

Figure 1:
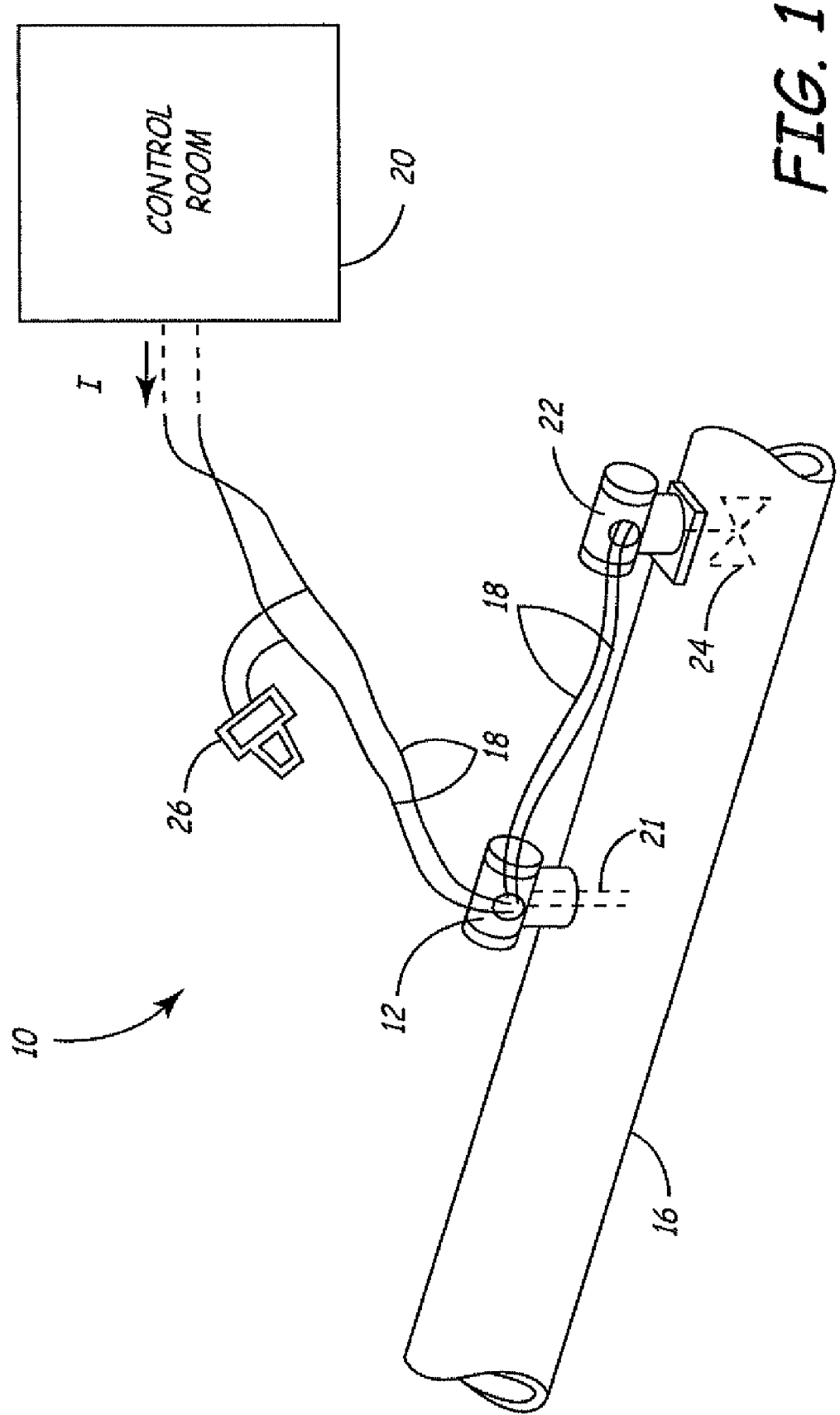
FIG. 1 is a diagram of an industrial process including a process transmitter coupled to process piping.

Many industrial processes are inherently hazardous. These processes typically use toxic, flammable or reactive materials, and often at elevated temperatures and pressures. In the event of equipment malfunction or human error in these processes a catastrophic event may occur. Safety Instrumented Systems (SIS) are automation systems designed to prevent these events. Interest, particularly in the chemical, petrochemical, and refining industries, in these safety systems has increased over the last few years because of new international standards.

A Safety Instrumented System may be defined as a system composed of sensors, logic solvers and final control elements designed for the purpose of:

Automatically taking a process to a safe state when predetermined conditions are violated.

Allowing a process to continue in a safe manner when specified conditions allow

Taking action to mitigate the consequences of an industrial hazard.

Safety Instrumented Systems (SIS) are very similar to Basic Process Control Systems (BPCS) in that they both use similar components. The systems include all the elements from the sensor to the final control element connected to the process, including inputs, outputs, SIS user interfaces, power supply, and a logic solver. SIS components are usually separate and independent from the BPCS. Given the purpose of a SIS, additional design requirements must be met. The Basic Process Control System (BPCS) Alarms, and Safety Instrumented Systems (SIS) are all prevention layers. Remaining layers are mitigation layers.

For example, a plant may have many layers of protection to protect personnel, equipment, and local communities from a catastrophic event. Some layers of protection are prevention layers and some layers are mitigation layers. A prevention layer is there to prevent the catastrophic event from happening. A mitigation layer is used to contain the event and reduce its cost after the event has occurred. The Basic Process Control System (BPCS), Alarms, and Safety Instrumented Systems are all prevention layers. Remaining layers are mitigation layers.

To illustrate layers of protection, an example of a reaction in a vessel can be used. Given the right conditions, the reaction could "runaway" and without different layers of protection, the tank could explode and cause significant damage.

Example Protection Layers Include:

Layer 1: Basic process control system to control the temperature/pressure.

Layer 2: An audible alarm to tell the operator to manually shut a valve to stop the reaction.

Layer 3: An SIS to reduce the pressure before the tank ruptures.

Example Mitigation Layers Include:

Layer 4: A pressure relief valve to open before the tank ruptures.

Layer 5: The Plant Emergency Response team to make sure that the vapor released by the pressure relief valve does not cause further damage and to minimize contamination to the environment.

The SIS layer is the final prevention layer. If there is a failure in the SIS, the hazard cannot be prevented, only the mitigation layers remain to limit the amount of resulting damage. It is important that the SIS layer provide enough protection to prevent significant damage or loss of life. The amount of protection required equates to risk management.

Although all the elements and components must be considered when specifying a SIS, the three key components in the calculation include sensors, logic solvers and final control elements.

Sensors measure pressure, temperature, flow, mass flow, level, flame detectors, pH or other parameters. They range from simple pneumatic or electrical switches to Smart transmitters with on-board diagnostics. SIS sensors can be the same as typical process sensors (under certain qualifying conditions) or can be sensors specifically designed for SIS applications. Sensors specially designed for SIS may have extra internal diagnostics and software allowing fault detection and controlled access to device setup and calibration.

Safety standards do not prescribe any specific type or technology for sensors used in SIS applications. It is up to the designer of the system to determine an optimized/safe technology to meet the standard.

However, standards do define the specific requirements the end user must follow when specifying, installing, and maintaining SIS sensors.

The logic solver is typically a controller that reads signals from the sensors and executes preprogrammed actions to prevent a hazard. There are many similarities between a safety logic solver and a conventional Digital Control System (DCS) or Programmable Logic Controller (PLC). They both perform logic functions and both have input and output capability from sensors and final control elements. The difference is that the SIS Logic Solver is designed to be fault tolerant, have internal redundancy, and designed to fail in a safe mode. They are designed with extra internal diagnostics and hardware and software that will allow it to detect faults. The safety logic solver also has added security to ensure against accidental configuration changes.

Similar to sensors, standards do not dictate what type of Logic Solver to use, only the requirements for its application.

Final Control Elements represent the final stage in implementing a safety shutdown. This is the component that acts to bring about the safe state. These elements include solenoid valves, ON/OFF valves, and motor starters. The most common are solenoid valves which provide air to a diaphragm or the piston actuator of a process shutdown valve. Valve suppliers have recently released smart positioners expressly designed for SIS applications. Similar to sensors, SIS final control elements can be the same as typical process final control elements under certain qualifying conditions or they can be specifically designed for SIS applications. These specially designed final control elements have extra internal diagnostics and software enabling fault detection.

Again, similar to sensors, standards do not prescribe any specific technology for final control elements used in SIS applications. It is up to the designer of the system to determine an optimized/safe technology. The standard only states the requirements the end user must follow.

There is a similar theme in the three components of a SIS. That theme is diagnostics. A SIS is designed to detect a process upset and bring the process back to a safe state. It is imperative that the operator be made aware of any SIS fault and be able to respond to it.

As discussed above, process devices which are used to measure, monitor and control industrial processes, are typically designed to a very high level of reliability. However, there are some instances in which process devices must meet further operational requirements. For example in a Safety Instrumented System, the process device may be required to meet certain Safety Integrity Level (SIL) certifications. Example regulatory standards include IEC 61511, IEC 61508 and ISA SP 84.01. These standards require complex development processes, rigid control over changes in the components, and significant validation and verification activities. Compliance with these standards often requires extra design time and adds a level of uncertainty to the overall development cycle for new process devices. Further, once a device is certified, any change to the device must be analyzed and the device recertified, if necessary.

One of the primary elements of obtaining a Safety Integrity Level (SIL) certification is an analysis to determine the Safe Failure Fraction (SFF) of the device. SFF analysis is performed using a Failure Modes, Effects and Diagnostics Analysis (FMEDA) on the device to determine how the device behaves during various hardware and software fault conditions for all of the components in the device. This test attempts to determine the total number of potentially dangerous device failures and the percentage of those failures which are prevented from incorrectly altering the output of the device. In a specific example, to achieve a SIL2 certification, the FMEDA must indicate an SFF of at least 90%.

The present invention provides a supervisory overlayer for using with or in a process device. The supervisory overlayer monitors operation of the process device and is used to prevent, mitigate and/or detect failure of component(s) or other aspects of the device, including the supervisory overlayer itself. The present invention is applicable to Safety Instrumented Systems as well as Basic Process Control Systems.

In general, the present invention is applicable to any process device including measurement (sensor), control and host (logic solver) devices. A "supervisory wrapper" is placed around a device, or portions of a device, and provides an improved safety integrity level. This allows the creation of a safety certified device that includes non-certified components or devices. In one embodiment, a non-certified device can be upgraded, for example while in the field, into a certified device through a software upgrade. In a second embodiment, a non-certified device can be upgraded, for example while in the field through an electronics upgrade. In addition to its use with SIS, this "supervisory wrapper" can be used to provide improved capability for the device such as advanced diagnostics. The present invention uses various techniques to improve the safety integrity level for a device. For example, the "supervisory overlayer" provided by the invention can identify a component that may fail, or is in the process of failing prior to its ultimate failure such that the component can be replaced without triggering an unsafe condition. In another example, the invention can compensate for a component that has failed, or is in the process of failing such that an unsafe condition does not occur. In another example, the invention can provide an output which indicates that an unsafe condition has occurred, or is about to occur such that appropriate steps can be taken. When used with an SIS device, the invention can provide an indication that the device's monitoring or response capability has or may fail.

FIG. 1 is a diagram of process control system 10 which includes a transmitter 12 connected to process pipe 16. System 10 can be a basic process control system or can be a safety instrumented system. As discussed below, transmitter 12 is one type of process device and the present invention is applicable to any process device.

Transmitter 12 is coupled to a two-wire process control loop which operates in accordance with a communication protocol such as Fieldbus, Profibus or HART® standard. Currently, SIS systems are only approved with two-wire 4-20 mA loops. However, the invention is not limited to these standards or a two-wire configuration. Two-wire process control loop 18 runs between transmitter 12 and the control room 20. In an embodiment in which loop 18 operates in accordance with the HART® protocol, loop 18 carries a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries a digital signal and can be coupled to multiple field devices such as other transmitters.

The present invention is applicable to any process device which is used in a process control environment. In general, process devices, such as transmitter 12 shown in FIG. 1 are used to monitor or control process variables. Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal may include calibration values, alarms, alarm conditions, the signal which is provided to a control element such as a valve position signal which is provided to a valve actuator, an energy level which is provided to a heating element, a solenoid on/off signal, etc., or any other signal which relates to control of the process. In the context of SIS, the control signal can be a signal which safely shuts down a process. A diagnostic signal as used herein includes information related to operation of devices and elements in the process control loop, but does not include process variables or control signals. For example, diagnostic signals may include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter (other than process variables) which may be detected or measured in the system. Furthermore, process signal means any signal which is related to the process or element in the process such as, for example, a process variable, a control signal or a diagnostic signal. Process devices include any device which forms part of, or couples to, a process control loop and is used in the control or monitoring of a process.

As discussed above, FIG. 1 is a diagram showing an example of a process control system 10 which includes process piping 16 which carries a process fluid and two wire process control loop 18 carrying loop current I. A transmitter 12, controller 22, which couples to a final control element in the loop such as an actuator, valve, a pump, motor or solenoid, communicator 26, and control room 20 are all part of process control loop 18. It is understood that loop 18 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol. In operation, transmitter 12 senses a process variable such as flow using sensor 21 and transmits the sensed process variable over loop 18. The process variable may be received by controller/valve actuator 22, communicator 26 and/or control room equipment 20. Controller 22 is shown coupled to valve 24 and is capable of controlling the process by adjusting valve 24 thereby changing the flow in pipe 16. Controller 22 receives a control signals over loop 18 from, for example, control room 20, transmitter 12 or communicator 26 and responsively adjusts valve 24. In another embodiment, controller 22 internally generates the control signal based upon process signals received over loop 18. Communicator 26 may be the portable communicator shown in FIG. 1 or may be a permanently mounted process unit which monitors the process and performs computations. Process devices include, for example, transmitter 12 (such as a 3051S transmitter available from Rosemount Inc.), controller 22, communicator 26 and control room 20 shown in FIG. 1. Another type of process device is a PC, programmable logic unit (PLC) or other computer coupled to the loop using appropriate I/O circuitry to allow monitoring, managing, and/or transmitting on the loop.

Any of the process devices 12, 20, 22 or 26 shown in FIG. 1 may include a supervisory overlayer capability in accordance with the present invention.

Figure 2:
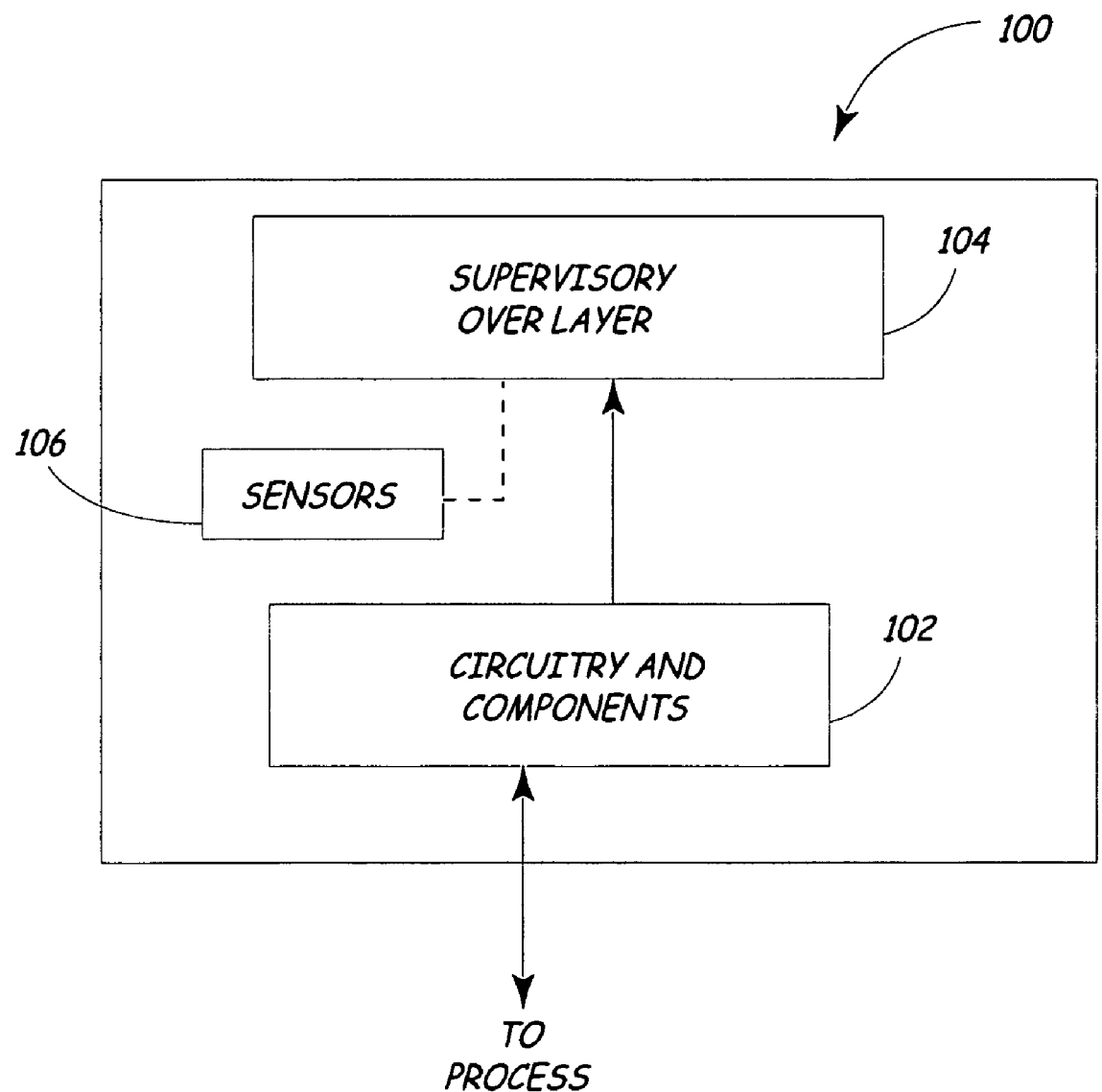
FIG. 2 is a simplified block diagram showing a process device with a supervisory overlayer.

FIG. 2 is a simplified block diagram of a process device 100 in accordance with one embodiment of the present invention. Process device 100 includes process circuitry and components 102 which allow the device 100 to interact with the industrial process. Such interaction can include monitoring or controlling process variables for use in a basic process control system or a safety instrumented system. In accordance with the present invention, process device 100 includes a supervisory overlayer 104 which couples to process circuitry and components 102. Optional additional sensor(s) 106 can also couple to supervisory overlayer 104 and be used to monitor operation of components in process device 100.

During operation, circuitry and components 102 of process device 100 operate generally in accordance with standard process device components. For example, the process device circuitry and components 102 may sense a process variable for use by the process device 100 or for transmission over the two-wire process control loop 18, or may generate an output which is used to control operation of the process, for example by controlling a valve. If supervisory overlayer 104 detects the occurrence of a component failure, an impending component failure, or the possibility that a component might fail, supervisory overlayer 104 controls the process device 100 in order to take steps appropriate with the desired safety integrity level certification. For example, supervisory overlayer 104 can compensate for measurement errors if the amount of the error can be accurately determined or approximated. Alternatively, or in addition to, supervisory overlayer 104 can take steps to shut down the process device 100 and/or send a message to external components, for example through process control loop 18, indicating the fault or failure that has been sensed or predicted by supervisory overlayer 104.

Figure 3:
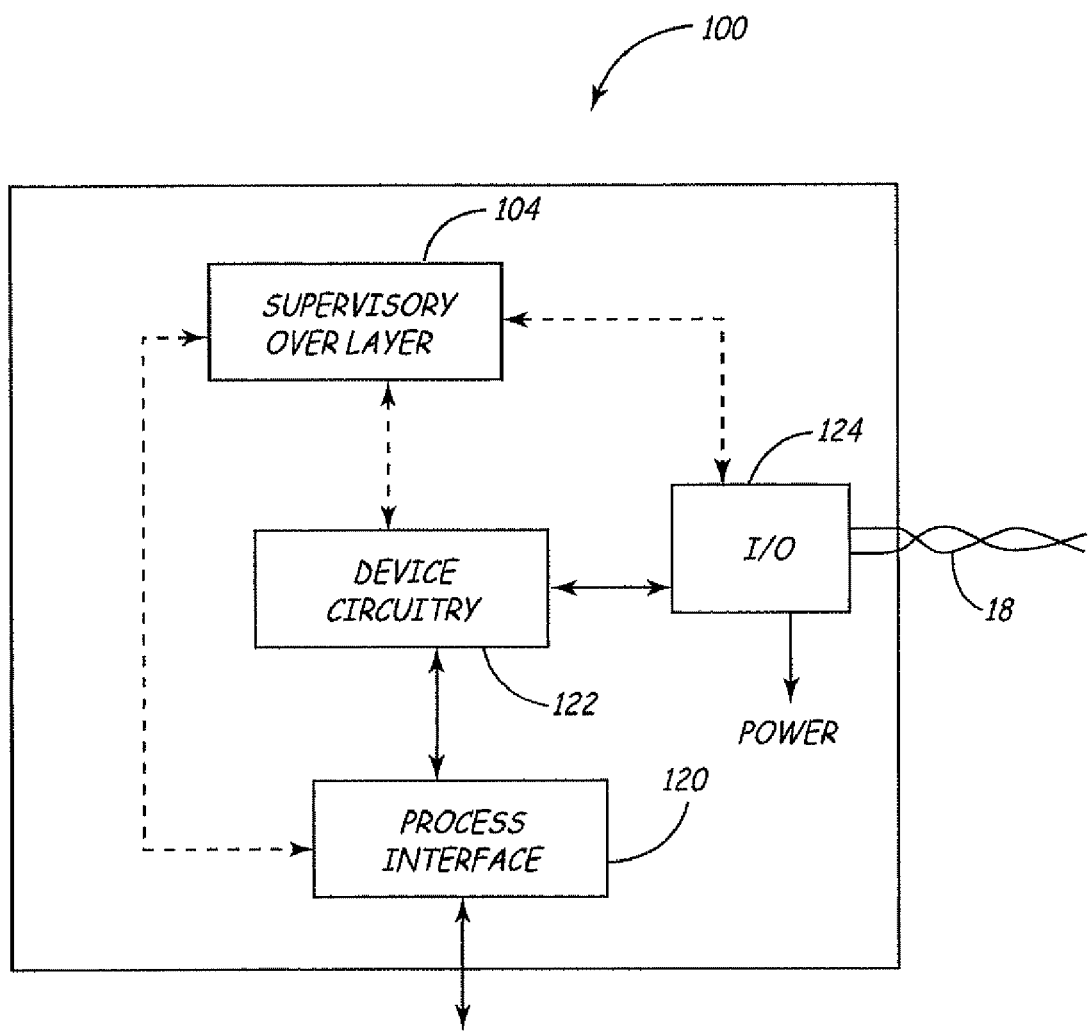
FIG. 3 is another simplified block diagram showing the process device of FIG. 2.

FIG. 3 is a simplified diagram of a process device showing another view of the supervisory overlayer 104. In FIG. 3, a process device 100 is shown as including a process interface 120, device circuitry 122 and input/output circuitry 124. The process interface 120 can be any mechanical and/or electrical circuitry which is used to couple the process device 100 to the industrial process. For example, the process interface can comprise a sensor such as a pressure sensor, flow sensor, temperature sensor, etc. used to sense process variables of the process. Other types of sensors are used to sense operation of the process device, for example current sensors, voltage sensors, etc. Similarly, process interface 120 can comprise an output stage which couples to a control element, for example an output stage which provides a signal to a valve controller which controls operation of the valve, or can include the final control element itself. The device interface can comprise any interface with a component of the device, and can include a connection used for other purposes by the device. For example, a connection to a databus by a microprocessor can provide a device interface. The device circuitry 122 in general comprises the electrical circuitry within device 100 which is used to perform the various functions of device 100. For example, the circuitry can be used for measurement or control of the industrial process. The input/output interface 124 is used to couple the process device 100 to an external component of the process control system. In the example shown in FIG. 3, the input/output circuitry 124 couples to a two-wire process control loop 18. Circuitry 124 can be used to send information over loop 18 or receive information from loop 18. In some embodiments, circuitry 124 includes the ability to power all of the circuitry within device 100 with power received over process control loop 18. The supervisory overlayer 104 may couple to one or more of the circuits 120, 122 or 124 as desired. The supervisory overlayer 104 can be implemented in software in a microprocessor, along with any required sensors or circuitry. The microprocessor can be a general microprocessor used to operate process device 100 or a separate microprocessor to execute the supervisory overlayer function. Some or all of the components which implement supervisory overlayer 104 can be shared with other circuitry within process device 100.

Figure 4:
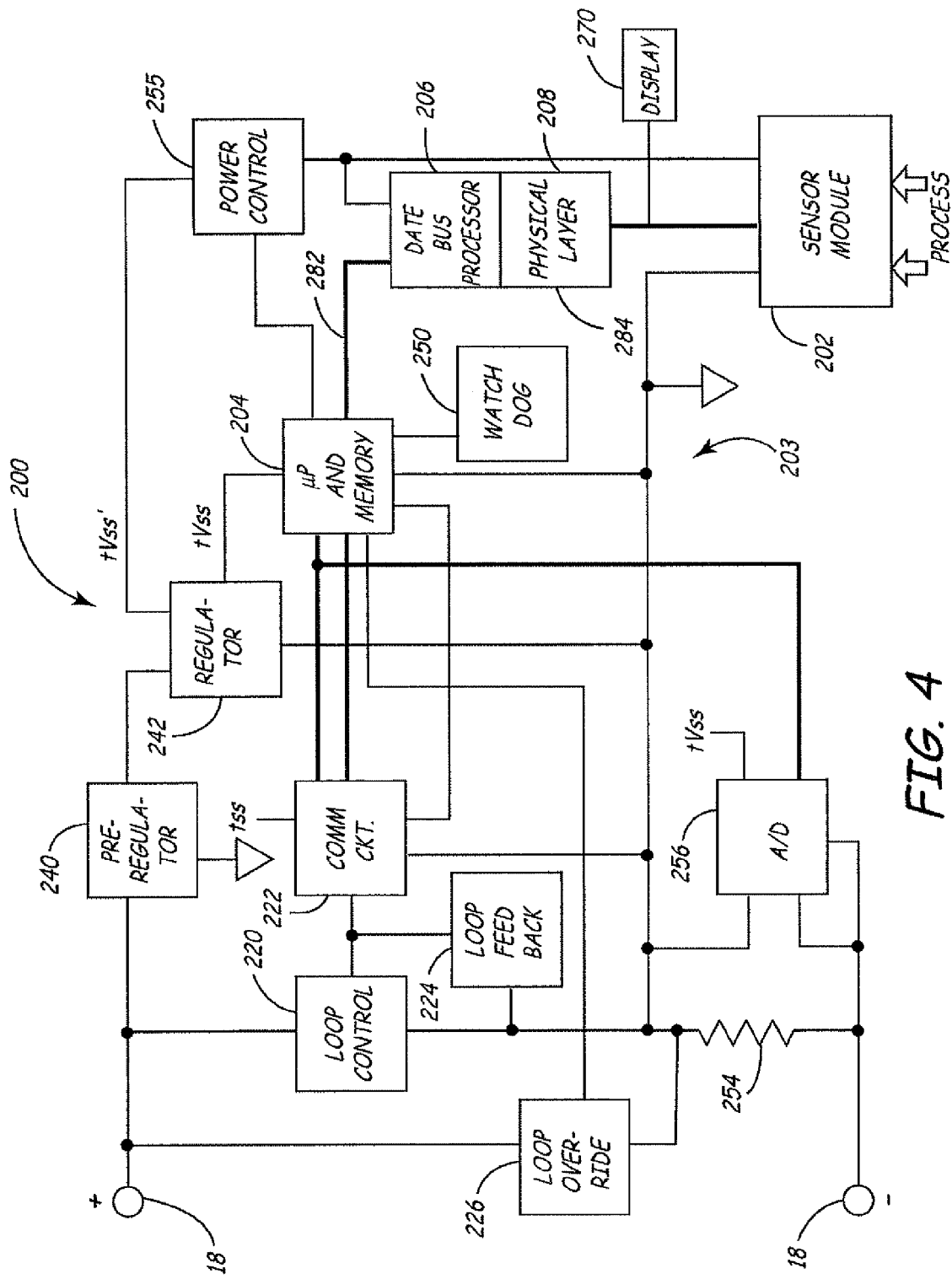
FIG. 4 is a block diagram of a process device including various examples of specific supervisory overlayer functionality.

FIG. 4 is a block diagram of a process device 200 which includes a specific implementation of the supervisory overlayer 104 shown in FIGS. 2 and 3. In the embodiment of FIG. 4, the supervisory overlayer is implemented through multiple components in device 200. Process device 200 is configured as a transmitter and includes a sensor module 202 which is configured to couple to the industrial process and measure a process variable. In accordance with known techniques, device 200 provides an output on loop 18 which is related to one or more process variables sensed by a sensor in sensor module 202 which couples to a feature module 203. Device 200 includes a microprocessor and memory 204 which couples to sensor module 202 through a data bus provided by data bus processor 206 and physical layer 208. Communication over process control loop 18 to and from the microprocessor 204 is provided using loop control circuitry 220 and communication circuitry 222. In accordance with techniques known in the art, communication is effected using analog and/or digital protocols. A loop feedback circuit 224 is used to monitor current through the loop 18 and provides feedback to communication circuitry 222. Loop override circuitry 226 is configured to override loop control circuitry 220 and set the loop current to a predefined level. In the embodiment shown in FIG. 4, power from the loop 18 is also used to completely power the process device 200. A linear preregulator 240 provides a preregulated voltage to voltage regulator circuitry 242. Voltage regulator circuitry 242 provides supply voltages +VSS and +VSS' to circuitry within process device 200. A separate power control module 255 provides power to the sensor module 202.

Microprocessor 204 is connected to windowed watch dog circuitry 250. The circuit 250 resets microprocessor 204 if microprocessor 204 does not provide periodic inputs to circuit 250. A voltage drop across a resistor 254 is measured by analog to digital (A/D) converter 256 which provides an output to microprocessor 204. The voltage drop across resistor 254 is related to the current flowing through loop 18. Microprocessor 204 also couples to a loop override circuit 226. In some embodiments, sensor module 202 also couples to a display 270 such that information can be locally displayed by process device 200.

Device 200 implements a number of different supervisory overlayer functions. The supervisory overlayer can be provided as a modular attachment for example by updating software in the memory of controller 204, or retrofit to existing process control devices.

One supervisory overlayer function may include monitoring the stream of process measurement data provided by sensor module 202. The process variables are carried on data bus 282 and 284. However, in addition to monitoring the process variable stream, the supervisory overlayer functionality can monitor other activity on data bus 282 and 284 and provide a desired alarm output. If the sensor module 202 stops providing process variable updates, programming instructions within microprocessor 204 identifies a safety event. Upon detection of a loss of data, the response of the microprocessor 204 can be configured as desired. For example, the microprocessor can provide a local alarm signal or can transmit an alarm signal on process control loop 18. If partial data loss is detected, in addition to providing an alarm signal, the microprocessor 204 can also attempt to interpolate between data points to provide limited functionality during the failure.

In another example of the supervisory overlayer, the data stream provided to the display 270 is monitored. If loss of the data stream is detected by microprocessor 204, the process device 200 can enter a selected alarm state, for example by transmitting an alarm over loop 18.

In another embodiment of the supervisory overlayer, the power control circuitry 255 monitors and controls power provided to the sensor module 202. For example, if the current drawn by the sensor module 202 exceeds a threshold, the power control circuit 255 can limit the current to the sensor module, or completely disconnect the sensor module if desired. Additionally, an alarm output can be provided. This allows the process device 200 to continue with limited functionality even though the sensor module 202 is failing without allowing the failure of sensor module 202 to cause complete failure of the entire device.

In another example embodiment of this supervisory overlayer, the current level to which the loop 18 is set is measured by the A/D 256 and provided to the microprocessor block 204. If the microprocessor detects that the loop current is different than the value to which the loop control circuitry 220 has set the current, the microprocessor 204 can provide an alarm output. If desired, the microprocessor 204 can temporarily recalibrate the loop control circuitry 220 such that the loop current I is set to the desired level. Similarly, in some embodiments the microprocessor 204 can activate loop override circuitry 226 which overrides operation of loop current control circuitry 220 and causes the loop current I to be driven to a predetermined level. The predetermined level can comprise, for example, an alarm level.

In yet another example implementation of the supervisory overlayer, a windowed watch dog circuit 250 monitors operation of microprocessor 204. During normal operation, the microprocessor 204 is configured to regularly send a signal to the watch dog circuitry 250. If the watch dog circuitry 250 either receives a signal from microprocessor 204 too frequently or too slowly, the watch dog circuitry 250 can cause the device 200 to provide a desired alarm, for example an alarm signal on loop 18 using loop override circuitry 226.

In another example, operation of the memory of microprocessor and memory block 204 is monitored. For example, memory can include a checksum bit or other error detection mechanism. If the error detection mechanism indicates that the data stored in the memory is in error, the microprocessor can provide a desired response, such as initiating an alarm condition. The memory can be either volatile or non-volatile memory.

Figure 5:
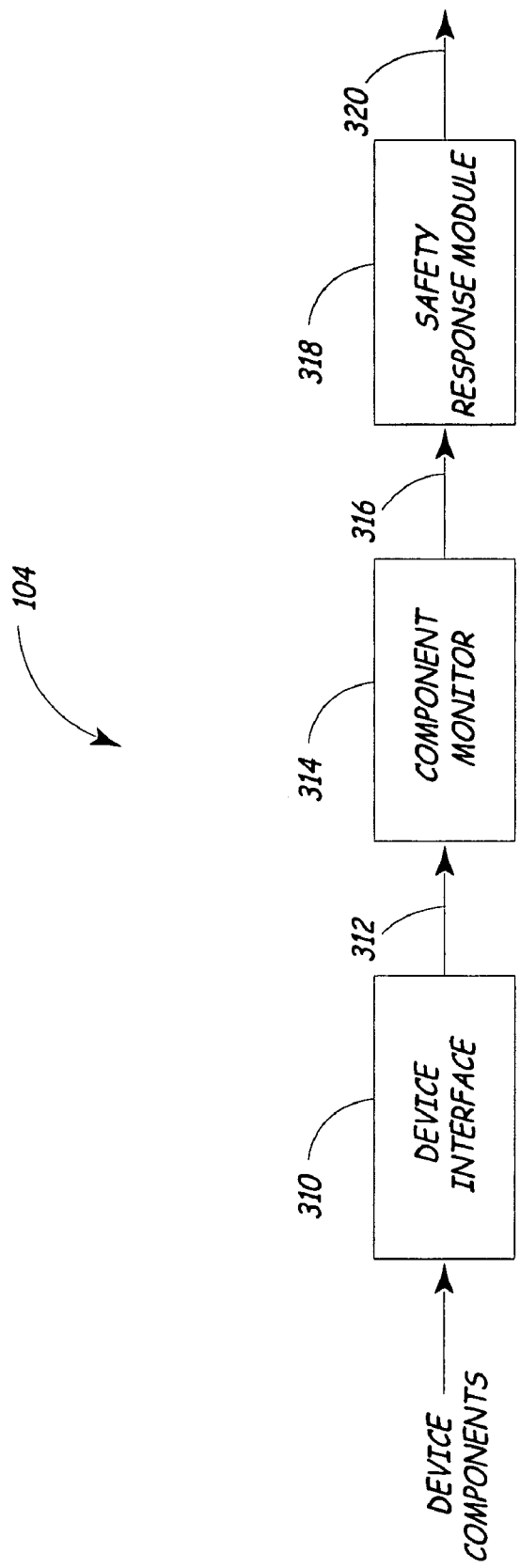
FIG. 5 is a simplified diagram of various components of a supervisory overlayer in accordance with the present invention.

FIG. 5 is a simplified block diagram of supervisory overlayer 104. As illustrated in the above examples, the supervisory overlayer can detect various types of failures or impending failures. The above examples are for illustration purposes only. In general, the supervisory overlayer includes some type of device interface 310 which couples to a component or components of the process device. This can be a physical coupling, or can be an electrical coupling or other coupling such that data or other signals are monitored. The device interface 310 provides an output 312 related to operation of a component or components of the process device. The output 312 is received by a component monitor 314 which monitors operation of the component or components based upon the output 312. The component monitor is configured to identify a safety event in the component and provide an output 316 to a safety response module 318. A safety event can be a prediction or indication of a future failure or the detection of a failure such as those discussed herein, or can be defined in accordance with a particular safety standard or requirement. The safety response module 318 provides a safety response 320 in accordance with a desired safety standard. The particular implementation of device interface 310, component monitor 314, and safety response module 318 can vary widely based upon the implementation and may include both hardware and software components. Further, the various blocks illustrated in FIG. 5 can exist in components which already exist in a process device or can share components among each other or among other components.

In some embodiments, the supervisory overlayer of the present invention is adapted to be retrofit to an existing device. The retrofit can be performed during or after manufacturer. For example, the supervisory overlayer can be embodied in a feature module or board 203 for coupling to an existing sensor module 202 such as shown in FIG. 4. In another example embodiment, the supervisory overlayer can be provided through a software update. The software update can be performed in the field, or remotely and transmitted over a communication bus such as a two wire process control loop. Preferably, the software and circuitry associated with the supervisory overlayer is completely isolated from other components in the device. This provides additional redundancy. The supervisory overlayer can monitor more than one device, and is not limited to monitoring the device in which it is implemented. Similarly, the supervisory overlayer can operate across multiple (distributed) devices such that functions are performed between multiple devices and information communicated between them. The supervisory overlayer can be implemented in a device which is part of the basic process control loop, or can be implemented in a device which implements a safety instrumented system. In one aspect, the supervisory overlayer provides information related to the availability of a particular device or component and allows the device or component to be taken out of the loop, in a predetermined manner upon detection of an unavailability or of pending unavailability.

Although the present invention has been described with reference to preferred embodiments, workers skilled in the art will recognize that changes may be made in form and detail without departing from the spirit and scope of the invention. The examples specifically set forth herein are just for illustrative purposes only. The supervisory overlayer can detect other failures or conditions and provide a controlled response such as shutting down the process device and/or sending an alarm signal. By using the present invention, standard components used in process devices can be monitored such that the process device meets safety standards, such as those required in certain certification procedures, which the individual components and process device could not otherwise achieve. In general, the supervisory overlayer includes some type of device interface which couples to the process device and provides an output related to operation of component or components of the device. Some type of component monitor monitors operation of the component based upon the output from the device interface. A safety failure of the component is identified by the component monitor and a safety response module provides a desired safety response in accordance with the safety failure. The supervisory overlayer, device interface, component monitor and safety response module can be implemented in software and/or hardware. The supervisory overlay can monitor a plurality of process device including devices which a distributed across a control system. The supervisory overlayer can be implemented in a device which is completely powered with power from a two wire process control loop, or can receive power from another source. The present invention can be used in conjunction with techniques set forth in U.S. application Ser. No. 10/733,558, filed Dec. 11, 2003 and entitled PROCESS DEVICE WITH LOOP OVERRIDE.

What is claimed is:

1. A process device for measuring a process variable of an industrial process, comprising:
   a process variable sensor configured to sense the process variable;
   device circuitry coupled to the process variable sensor configured to process an output from the process variable sensor and provide an output related to the sensed process variable;
   a databus configured to carry data between at least two components of the process device, the two components contained within the process device;
   safety response circuitry contained within the process device and which is separate from the two components, the safety response circuitry comprising;
   a device interface to couple to the process device and provide an output related to operation of a component of the process device, wherein the device interface comprises a connection to the databus of the process device which is used to transfer digital data between the at least two components of the device and a microprocessor of the device;

a component monitor to monitor data carried on the databus, and monitor operation of the component of the process device based upon the output from the device interface and responsively identify a safety event of the component indicative of a failure of the component and provide a safety event output; and a safety response module to respond to the safety event of the component based upon the safety event output in accordance with a safety response; and wherein the device interface, component monitor and safety response module are isolated from other components of the process device to provide redundancy.

2. The apparatus of claim 1 wherein the device interface comprises a sensor coupled to the process device.

3. The apparatus of claim 2 wherein the process device couples to a process control loop and the sensor monitors current flow in the process control loop.

4. The apparatus of claim 3 wherein the component monitor compares the sensed current with a current value.

5. The apparatus of claim 1 wherein the safety response module controls the current in a process control loop based upon a safety failure.

6. The apparatus of claim 1 wherein the device interface comprises a watch dog circuit.

7. The apparatus of claim 1 wherein the device interface senses power drawn by circuitry of the process device.

8. The apparatus of claim 1 wherein the device interface couples to a memory.

9. The apparatus of claim 8 wherein the component monitor detects errors in the data stored in the memory.

10. The apparatus of claim 1 wherein the safety response module provides an alarm output.

11. The apparatus of claim 1 wherein the safety response module disconnects the process device from a process control loop.

12. The apparatus of claim 1 wherein the safety response module disconnects circuitry in the process device.

13. The apparatus of claim 1 wherein the safety response module attempts to compensate for the safety failure.

14. The apparatus of claim 12 wherein the safety response module corrects for errors in data in the device.

15. The apparatus of claim 14 wherein the safety response module interpolates between data points in order to correct a data error.

16. The apparatus of claim 14 wherein the safety response module holds a previous data point.

17. The apparatus of claim 2 wherein the sensor comprises a voltage sensor.

18. The apparatus of claim 2 wherein the sensor comprises a current sensor.

19. The apparatus of claim 1 wherein the device interface monitors data carried in a databus of the device.

20. The apparatus of claim 1 wherein the component monitor comprises software implemented in a microprocessor of the device.

21. The apparatus of claim 1 wherein the safety event comprises a possibility of a future component failure.

22. The apparatus of claim 1 wherein the safety event comprises a detection of a component failure.

23. The apparatus of claim 1 wherein the safety response module is implemented in a feature module which couples to a sensor module of the process device.

24. The apparatus of claim 1 wherein the safety response module is implemented in a feature module which couples to a plurality of sensor modules.

25. The apparatus of claim 23 wherein the component monitor monitors data from a sensor in the sensor module.

26. The apparatus of claim 1 including a display and wherein the component monitors data sent to the display.

27. The apparatus of claim 1 wherein the component monitor monitors a plurality of process devices.

28. The apparatus of claim 1 wherein the component monitor and safety response module are implemented in software.

29. The apparatus of claim 28 wherein the software upgrades an existing process device.

* * * * *